(12) United States Patent
Fischer

(10) Patent No.: US 11,715,020 B2
(45) Date of Patent: Aug. 1, 2023

(54) DEVICE, CONFIGURED TO OPERATE A MACHINE LEARNING SYSTEM BASED ON PREDEFINABLE ROLLOUT

(71) Applicant: Robert Bosch GmbH, Stuttgart (DE)

(72) Inventor: Volker Fischer, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1040 days.

(21) Appl. No.: 16/422,308

(22) Filed: May 24, 2019

(65) Prior Publication Data
US 2020/0034715 A1    Jan. 30, 2020

(30) Foreign Application Priority Data
Jul. 30, 2018    (DE) .......................... 202018104373.0

(51) Int. Cl.
| | | |
|---|---|---|
| G06N 3/10 | (2006.01) | |
| G06N 3/08 | (2023.01) | |
| G06N 20/00 | (2019.01) | |
| G06N 3/044 | (2023.01) | |

(52) U.S. Cl.
CPC .............. *G06N 3/10* (2013.01); *G06N 3/044* (2023.01); *G06N 3/08* (2013.01); *G06N 20/00* (2019.01)

(58) Field of Classification Search
CPC .......... G06N 3/10; G06N 3/0445; G06N 3/08
See application file for complete search history.

(56) References Cited

FOREIGN PATENT DOCUMENTS

DE    102018200724 A1    10/2018

OTHER PUBLICATIONS

Carreira et al., "Massively Parallel Video Networks," in arXiv preprint arXiv:1806.03863 (2018). (Year: 2018).*
Fischer et al., "The Streaming Rollout of Deep Networks—Towards Fully Model-Parallel Execution," in arXiv preprint arXiv:1806.04965v1 (2018). (Year: 2018).*
Anonymous Authors: "Statestream: A Toolbox to Explore Layerwise-Parallel Deep Neutral Networks", QoenReview.net, Feb. 15, 2018; URL: htpps://openreview.net/forum?id=SkfNU2e0Z&noteId=SkfNU2e0Z.
Bengio, Yoshua: Lecture 11: Recurrent Neural Networks, University of Montreal, Feb. 11, 2016. URL: http:www.iro.umontreal.ca/~bengioy/ift6266/H16/mn.pdf.

(Continued)

*Primary Examiner* — Kamran Afshar
*Assistant Examiner* — Ryan C Vaughn
(74) *Attorney, Agent, or Firm* — Norton Rose Fulbright US LLP; Gerard Messina

(57) ABSTRACT

A device for operating a machine learning system. The machine learning system is assigned a predefinable rollout, which characterizes a sequence in which each of the layers ascertains an intermediate variable. When assigning the rollout, each connection or each layer is assigned a control variable, which characterizes whether the intermediate variable of each of the subsequent connected layers is ascertained according to the sequence or regardless of the sequence. A calculation of an output variable of the machine learning system as a function of an input variable of the machine learning system is controlled as a function of the predefinable rollout. Also described is a method for operating the machine learning system.

31 Claims, 5 Drawing Sheets

(56) References Cited

OTHER PUBLICATIONS

Campos, et al.: "Skip RNN: Learning to Skip State Updates in Recurrent Neural Networks", in CoRR, Feb. 5, 2018, ICLR conference paper; pp. 1-17.
Chang, et al.: "Dilated Recurrent Neural Networks", in CoRR Nov. 2, 2017, NIPS 2017, Long Beach CA, USA, pp. 1-13.
Fisker, Volker: "Statestream: A toolbox to explore layerwise-parallel diip neural networks", Jan. 25, 2018 ISLR Conference, pp. 1-4.
Wu, et al.: "An Empirical Exploration of Skip Connections for Sequential Tagging" in Proceedings of COLING 2016, the 26th International Conference on Computational Linguistics, Japan, pp. 203-212.
Volker Fischer et al., "The Streaming Rollout of Deep Networks—Towards Fully Model-Parallel Execution", 32nd Conference on Neural Information Processing Systems, 2018, pp. 1-20, www.arxiv.org <http://www.arxiv.org> With the Publication No. ARXIV:1806.04965.

* cited by examiner

DEVICE, CONFIGURED TO OPERATE A MACHINE LEARNING SYSTEM BASED ON PREDEFINABLE ROLLOUT

FIELD OF THE INVENTION

The present invention relates to a device which is configured to operate a machine learning system. The present invention also relates to a method and to a computer program for operating the machine learning system.

BACKGROUND INFORMATION

The non-prepublished patent specification DE 10 2018 200 724.1 describes a method for efficiently ascertaining output signals of a sequence of output signals from a sequence of input signals with the aid of a sequence of layers of a neuronal network.

The input signals of the sequence of input signals are fed successively to the neuronal network in a sequence of discrete time steps and signals of a layer of the sequence of layers present in each case in the neuronal network are further propagated at the discrete time steps.

The publication "The Streaming Rollout of Deep Networks—Towards Fully Model-Parallel Execution" by the authors Volker Fischer, Jan Köhler, Thomas Pfeil at www.arxiv.org with the publication number arXiv: 1806.04965 shows, among others things, mathematical proof that a complete, parallelized calculation of nodes of a graph for arbitrary structures of the graph is possible.

SUMMARY

The propagation of signals by a graph, in particular, by a deep neuronal network, is up to now calculated sequentially. This means that the nodes of the graph, in particular, the layers of the deep neuronal network, ascertain an output variable in sequential succession as a function of an input variable. This results in a sequential dependency of the nodes, since the nodes are only able to ascertain their output variable once the respective previous node has ascertained its output variable. In this case, the nodes, in particular, layers of the deep neuronal network, must wait until the output variable of the previous node has arrived at the respective subsequent node. This results in graphs, in particular, deep neuronal networks, that are slow.

In contrast to the related art, the present invention has the advantage that it enables the calculations of the nodes to be specifically controlled, so that a lesser dependency to no sequential dependency of the nodes occurs.

In a first aspect of the present invention, a method is introduced for operating a machine learning system, in particular, for controlling a calculation of the machine learning system. The machine learning system includes a plurality of layers, which are connected with the aid of connections. The machine learning system is assigned a predefinable rollout, which characterizes a sequence, according to which each of the series ascertains an intermediate variable. When assigning the rollout, each connection and/or each layer is assigned a control variable, which characterizes whether the intermediate variable of each of the subsequent connected layers is ascertained according to the sequence or regardless of the sequence. A calculation of an output variable of the machine learning system as a function of an input variable of the machine learning system is controlled as a function of the predefinable rollout.

Regardless of the sequence is understood below to mean that the calculations of the intermediate variables of the layers take place decoupled from the sequence. The sequence may define a succession, according to which each of the layers ascertains the output variables, for example, once a previous layer has ascertained its output variable.

The advantageous effect in this case is that the decoupling means that the individual layers may be calculated in a parallelized manner. As a result, the machine learning system is able to more quickly ascertain the output variable as a function of the input variable. Furthermore, the calculation time of a complete parallelization of the layers is a function only of the calculation time of the slowest layer and no longer a function of the sum of the calculation times of the individual layers, as is the case with the sequential calculation of the machine learning system.

It is provided that when controlling the calculation of the machine learning system step-wise, in particular, in succession, each of the layers, in particular, in each case at a predefinable point in time of a sequence of points in time, ascertains the intermediate variable according to the sequence of the rollout. Those layers that ascertain their intermediate variables regardless of the sequence, each ascertain their intermediate variables, in each case at each step, in particular, at the respective predefinable points in time.

The advantage in this case is that shorter response times of the machine learning system may be achieved.

It is further provided that the machine learning system includes at least one skip connection, which connects a first layer to a second layer and the first layer and the second layer are also directly connected with the aid of at least two connections.

The advantage of this is that with the skip connection, a higher response frequency may be achieved by the skipping of a plurality of layers and of the decoupling of these layers from the sequence.

It is further provided that the machine learning system includes at least one recurrent connection.

The advantage is that the decoupling of the layers having recurrent connections allows for an arbitrarily large virtual memory for recurrent connections.

It is further provided that those layers that ascertain their intermediate values regardless of the sequence, ascertain their intermediate variables as a function of a chronologically preceding intermediate variable, in particular, of a chronologically preceding calculation step, of the preceding layer. Those layers that ascertain their intermediate variable in sequence, ascertain their intermediate variable as a function of a chronologically instantaneous intermediate variable, in particular, of an instantaneous calculation step, of the preceding layer.

It is further provided that the machine learning system does not include a closed path.

The advantage in this case is that by avoiding a closed path, the calculations of the layers may be completely parallelized. A closed path is understood to mean that the beginning and the end of the path, which is defined by connections of the machine learning system, are connected to one another.

It is further provided that the intermediate variables of those layers that ascertain their intermediate variable regardless of the sequence, are each ascertained in parallel. Furthermore, the ascertainment in parallel of the intermediate variables may be carried out on processing cores connected in parallel.

It is further provided that the intermediate variables of those layers that ascertain their intermediate variable regardless of the sequence, are ascertained asynchronously.

It is further provided that when the machine learning system is provided an input variable for the first time, it is checked after each step, when ascertaining step by step according to the sequence of the output variable of the machine learning system, whether the intermediate variables of the previous layer, which are required for those layers that ascertain their intermediate variables regardless of the sequence, have already been ascertained.

This yields the advantage that it may be checked whether, during the start-up phase, intermediate variables already ascertained by deeper layers of the machine learning system may be provided as an input variable since these intermediate variables could not yet be ascertained according to the sequence at the point in time of the start-up phase of the machine learning system.

It is further provided that a plurality of the control variables of the predefinable rollout characterize that the respective intermediate variables are ascertained regardless of the sequence.

The advantage in this case is that the more layers that are decoupled from the sequence of the calculations of the layers, the more extensively the calculations of the layers may be parallelized.

It is further provided that when calculating the machine learning system, a sequence of input variables is provided to the machine learning system, in particular an input layer of the machine learning system, in direct succession, in each case, at one time step of a sequence of time steps, and a plurality of the layers or each layer ascertains the respective intermediate variable at each time step as a function of an input variable, which is assigned to one each of the input variables.

The advantage is that multiple provided input variables may be processed simultaneously in a parallelized manner with the aid of the machine learning system.

If is further provided that the machine learning system is assigned a plurality of different rollouts. The calculation of the machine learning is controlled in each case as a function of the assigned rollout. The controlled calculations of the machine learning system are compared with at least one predefinable comparison criterion. The predefinable rollout is selected from the plurality of different rollouts as a function of the comparison of the rollouts.

The advantage in this case is that, based on the comparison criterion, it is possible to ascertain a degree of the parallelization of the calculations of the individual layers as a function of the hardware, in particular, as a function of the provided processing power of the hardware, and of the specific application. Multiple processor cores may be efficiently utilized through the parallelization, for example; however, the processor cores are unable, for example, to support any complete parallelization of the machine learning system. Accordingly, the degree of parallelization may be ascertained as a function of the processor cores by comparing the rollouts.

It is further provided that in one of the rollouts, all connections and layers are each assigned the same control variable, so that the respective output variables are ascertained regardless of the sequence, in particular, in the subsequent time step.

The advantage is that all layers are decoupled from one another so that the calculation may be carried out in a completely parallelized manner.

It is further provided that in one of the rollouts, all connections or layers are each assigned the same control variable, so that the respective output variables are ascertained regardless of the sequence, in particular, in the subsequent time step.

It is further provided that when assigning the rollout, those connections that connect a first layer to a second layer, and the first layer and the second layer are also directly connected with the aid of at least two connections, are assigned the control variable so that the intermediate variable of the second layer is ascertained regardless of the sequence.

It is further provided that the control variables of the rollout are selected at random or as a function of an additional predefinable rollout.

It is further provided that the rollouts are compared with one another based on the predefinable comparison criterion, and the predefinable comparison criterion as a function of the control of the machine learning system is ascertained as a function of the respective assigned rollout. The predefinable comparison criterion may include one or a plurality of the following listed comparison criteria:

A first variable, which characterizes a number of time steps required in order, starting with a first time step at which the input layer is provided the input variable, to a second time step, at which an output layer has ascertained the output variable, the output layer being connected to no additional layer.

A second variable, which characterizes how many output variables the machine learning system has ascertained within a predefinable number of time steps.

A third variable, which characterizes how reliable, in particular, is an accuracy of the output variable of the machine learning system relative to the classification accuracy of the machine learning system for the respective rollout.

A fourth variable, which characterizes a period of time after which a start-up phase is completed, in particular, until the reliability of the output variable is stable over multiple time steps or calculation steps, or the classification accuracy has reached a maximum value.

A fifth variable, which characterizes how many connections, directly in succession, include the same control variable.

It is further provided that at least one of the control variables of the predefinable rollout is changed as a function of a disruption of the calculation of the machine learning system. A disruption may, for example, be understood to mean that the machine learning system has erroneously ascertained the output variable or one of the intermediate variables.

It is further provided that the input variable of the input layer is a detected sensor variable and a control variable is ascertained as a function of the calculation of the machine learning system.

The control variable may be used to control an actuator of a technical system. The technical system may, for example, be an at least semi-autonomous machine, an at least semi-autonomous vehicle, a robot, a tool, a factory machine or a flying object, such as a drone.

Alternatively, the input variable may, for example, be ascertained as a function of detected sensor data and provided to the machine learning system. The sensor data may be detected by a sensor such as a camera of the technical system, or may be received externally.

In another aspect, a computer program is provided. The computer program is configured to carry out one of the aforementioned methods. The computer program includes instructions, which prompt a computer to carry out one of these aforementioned methods with all its steps, when the computer program runs on the computer. Also provided is a machine-readable memory module, on which the computer program is stored.

In another aspect of the present invention, a device for operating a machine learning system is provided, which is configured to operate the machine learning system, the device including a machine-readable memory element, on which commands are stored which, when executed by a computer, ensure that the computer carries out the method that includes the steps of the first aspect of the present invention.

Exemplary embodiments of the aforementioned aspects are represented in the appended drawings and are explained in greater detail in the following description.

DETAILED DESCRIPTION

The names of the figures below are based on the publication "The Streaming Rollout of Deep Networks—Towards Fully Model-Parallel Execution". It should be noted that a graph may be a machine learning system.

Figure 1:
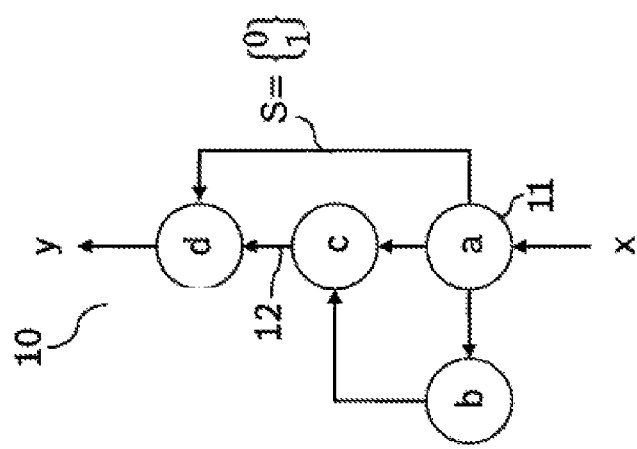
FIG. 1 schematically shows a representation of a graph, including nodes, which are connected with the aid of edges.

FIG. 1 schematically shows a representation of a graph 10. The graph includes a plurality of nodes a,b,c,d, which are connected with the aid of edges 12.

Edges 12 forward an output variable of a first node (c) to a second node d, in particular, this edge provides the output variable of first node c as an input variable to second node d. Alternatively, the edges may process, for example, weight or transform, the output variable of each first node, and subsequently provide it to the second node. Nodes a,b,c,d ascertain an output variable as a function of their respectively provided input variable, for example, as a function of a non-linear function, for this purpose, an activation function of the machine learning system.

In one exemplary embodiment, graph 10 is a deep neuronal network and nodes a,b,c,d each represent a layer of the deep neuronal network, which are connected with the aid of the edges.

Graph 10 includes at last one input node 11. Input node 11 receives an input variable x of graph 10 as its input variable. Input node 11 may ascertain its output variable as a function of provided input variable x. Output variable of input node 11 is forwarded to nodes b,c,d. In the exemplary embodiment in FIG. 1, node d is an output node, which ascertains as a function of its provided input variables, an output variable y, which may be an output variable of graph 10.

Edges 12 of graph 10 each include a control variable S. Control variable S in this exemplary embodiment may assume the value 0 or 1. Value 0 characterizes that the output variable, for example, of node a, is processed in a subsequent calculation step of a calculation window with the aid of connected node d according to a provided sequence, in which the input variable of graph 10 is propagated by graph 10. This means, node d receives the output variable of node a via an edge and waits until the output variable of node c is provided with the aid of edge 12 before node d ascertains its output variable as a function of these provided input variables.

If control variable S is assigned value 1, this means that the output variable, for example, of node a, is processed with the aid of the subsequently connected node d in the subsequent calculation step of the calculation window, and does not have to wait until the node is next in the provided sequence. This means that node d does not have to wait until the output variable of node a is propagated along a path, for example, via node c to node d and arrives at node d. Rather, node d may use the output variable of node c and the output variable of node a directly in the subsequent calculation step in order to ascertain its output variable y. This has the advantageous effect that node d does not have to wait until this node is provided the input variable with the aid of the edge and is thus decoupled from the provided sequence.

Figure 2:
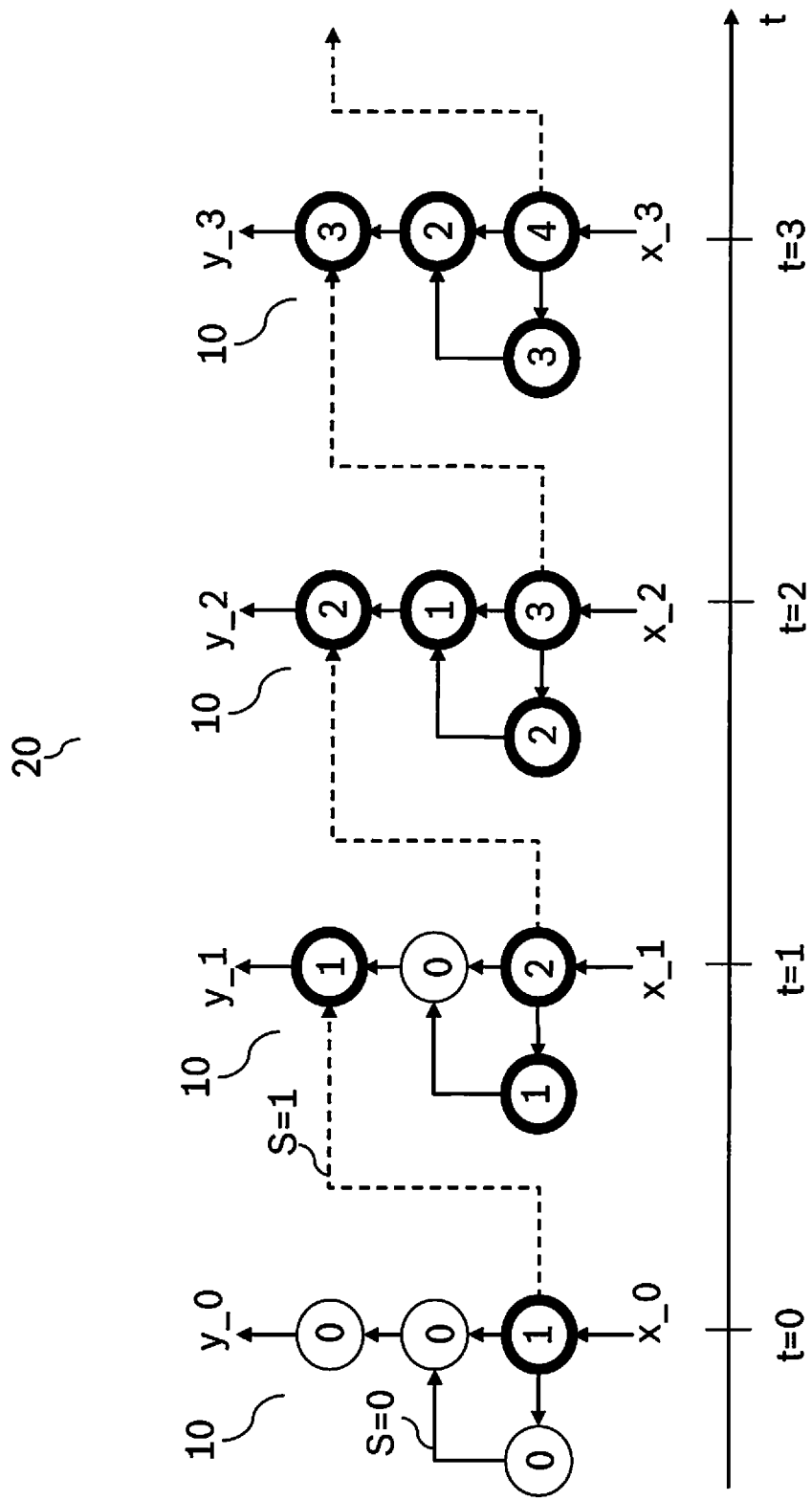
FIG. 2 schematically shows a representation of a calculation of the graph.

FIG. 2 schematically shows a representation of a control 20 of the calculation of graph 10. For this purpose, FIG. 2 shows a time axis t, which is assigned multiple points in time t=0, t=1, t=2, t=3, each of which indicates a beginning of a calculation step. In another exemplary embodiment, graph 10 is provided an input variable $x\_0, x\_1, x\_2, x\_3$ at each point in time t=0, t=1, t=2, t=3 and is processed with the aid of graph 10. Since in one exemplary embodiment of FIG. 2, an input variable is processed at each point in time, in particular, all nodes of the graph process an input variable, graph 10 may output an output variable $y\_0, y\_1, y\_2, y\_3$ at each point in time t=0, t=1, t=2, t=3.

In the exemplary embodiment according to FIG. 2, each edge of graph 10 is assigned a control variable S. Control variable S has either value 0 or value 1. If one of the edges includes control variable S having value 0, this edge is marked in FIG. 2 by a solid line. If one of the edges includes control variable S having value 1, this edge is marked in FIG. 2 by a dashed line. It should be noted that the solid edges provide the output variables to each connected node as an input variable only within one calculation step. In contrast, the dashed edges are able to forward the output variable along time axis t, so that this output variable is provided to the respective node as an input variable at the subsequent calculation step.

At point in time t=0, graph 10 is provided input variable $x\_0$. The input node of graph 10 may process provided input variable $x\_0$ within this calculation step, which began at point in time t=0. The fact that this node of graph 10 has processed the input variable, is characterized in FIG. 2 in that the node is outlined in black and a counter is incremented within the node, in this example, with value 1. All additional nodes of graph 10 each include a counter that has value 0, since these nodes have not yet carried out any processing of their respectively provided input variables.

An additional input variable $x\_1$ may be provided graph 10 at immediately subsequent point in time t=1. Other input variable $x\_1$ in this case is processed again by the input node, as a result of which its counter is incremented and now has value 2. Since node a and node b in this exemplary embodiment are connected by an edge that includes control variable S having value 0, node b waits until it is provided the output variable of node a. Once this node has calculated its output variable, this variable is marked in bold and its counter is incremented to value 1.

Since node a is connected by an edge to node d, and control value S equals 1, the output variable of node a is forwarded directly from the first calculation step, beginning at point in time t=0, and used again for the subsequent calculation step at point in time t=1. In this way, node d may ascertain its output variable already at point in time t=1 and is also outlined in bold and its counter is set to value 1.

At point in time t=2, node c receives the calculated output variable of node b and ascertains its output variable as a function of this output variable.

Its counter is subsequently incremented.

At subsequent point in time t=3 of preceding point in time t=2, input variable x_0 has been propagated along the entire path of graph 10 and output node d outputs associated output variable y_3, which may be assigned to input variable x_0.

Based on the edge that includes control variable S having value 1, it becomes apparent that the subsequent connected node ascertains its output variable with the aid of this edge, regardless of the sequence, which according to the sequence of the nodes that process in succession the input variable of graph 10.

In another exemplary embodiment, in which the edge, that connects node a to node b, includes control value S equaling 0, node d would have to wait until node c has ascertained its output variable. As a result, it becomes apparent that by specifically decoupling the node of graph 10, the calculation may be specifically accelerated, since the nodes no longer have to wait for the output variables of the previous node.

Figure 3:
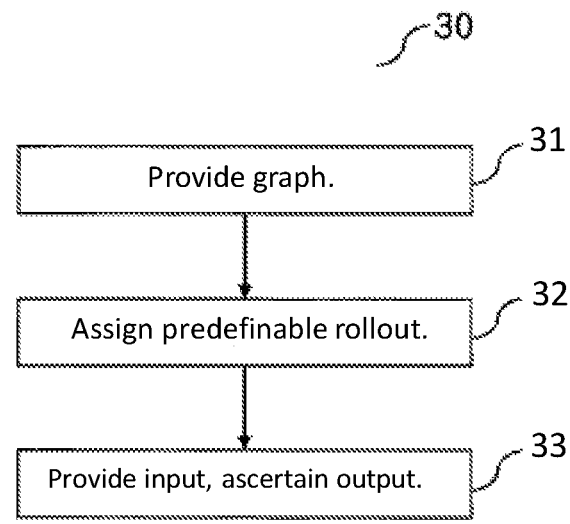
FIG. 3 schematically shows a representation of one specific embodiment of a control of the calculation of the graph.

FIG. 3 schematically shows a representation of a method 30 for calculating graph 10.

Method 30 starts with step 31. In step 31, graph 10 is provided. In following step 32, graph 10 is assigned a predefinable rollout. When assigning this rollout, each edge and/or each node is assigned a control variable S.

Step 33 follows upon completion of step 32. In step 33, graph 10 is provided an input variable. Graph 10 then ascertains the output variable of graph 10 as a function of the provided input variable. In this case, the calculation of the output variable of graph 10 is controlled as a function of the assigned rollout.

This ends method 30. It should be noted, however, that the method for operating a trained graph, in particular, of a trained machine learning system, may also be used when training the graph in order to ascertain output variable y as a function of a provided input variable x.

Figure 4:
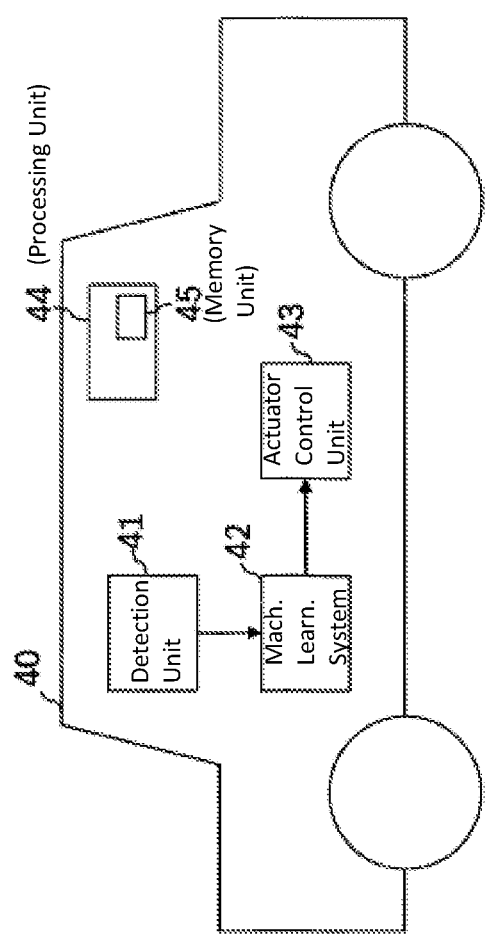
FIG. 4 schematically shows a representation of one specific embodiment of a use of the graph in an at least semi-autonomous vehicle.

FIG. 4 schematically shows a use of graph 10, which in this exemplary embodiment is a machine learning system 42 in an at least semi-autonomous vehicle 40. In another exemplary embodiment, the at least semi-autonomous vehicle 40 may be a service robot, assembly robot or stationary manufacturing robot, alternatively an autonomous flying object, such as a drone. The at least semi-autonomous vehicle 40 may include a detection unit 41. Detection unit 41 may, for example, be a camera, which detects surroundings of vehicle 40. Detection unit 41 may be connected to machine learning system 42. Machine learning system 42 ascertains an output variable as a function of a provided input variable, for example, provided by detection unit 41, and as a function of a plurality of parameters of machine learning system 42. The output variable may be forwarded to an actuator control unit 43. Actuator control unit 43 controls an actuator as a function of the output variable of machine learning system 42, preferably controls this actuator in such a way that vehicle 40 executes a collision-free maneuver. The actuator in this exemplary embodiment may be an engine or a braking system of vehicle 40.

Vehicle 40 further includes a processing unit 44 and a machine-readable memory unit 45. A computer program, which includes commands which, when the commands are carried out on processing unit 45, result in processing unit 45 carrying out the method for operating machine learning system 42 as shown, for example, in FIG. 3, may be stored on memory element 45. It is also conceivable that a download product or an artificially generated signal, each of which may include the computer program, after being received at a receiver of vehicle 40, prompts processing unit 44 to carry out the method for operating a machine learning system.

In one alternative exemplary embodiment, machine learning system 42 may be used for a building control system. A user behavior is detected with the aid of a sensor, for example, of a camera or of a motion detector, and the actuator control unit controls a heat pump of a heating unit, for example as a function of the output variable of machine learning system 42. Machine learning system 42 may then be configured to ascertain which operating mode of the building control system is requested, based on the detected user behavior.

In another exemplary embodiment, actuator control unit 43 includes a release system. The release system decides whether an object, for example, a detected robot or a detected person, has access to an area as a function of the output variable of machine learning system 42. The actuator, for example, a door opening mechanism, is preferably activated with the aid of actuator control unit 43. Actuator control unit 43 of the previous exemplary embodiment of the building control system may also include this release system.

In one alternative exemplary embodiment, vehicle 40 may be a tool, a factory machine or a manufacturing robot. A material of a workpiece may be classified with the aid of machine learning system 42. The actuator in this case may, for example, be a motor that drives a grinding head.

In another specific embodiment, machine learning system 42 is used in a measuring system, which is not depicted in the figures. The measuring system differs from vehicle 40 according to FIG. 4 in that the measuring system does not include actuator control unit 43. Instead of forwarding it to actuator control unit 43, the measuring system may store or represent the output variable of first machine learning system 42, for example, with the aid of visual or auditory representations.

It is also conceivable that in a refinement of the measuring system, detection unit 41 detects an image of a human or of an animal body or of a part thereof. This may take place, for example, with the aid of a visual signal, with the aid of an ultrasonic signal or with the aid of a MRT/CT method. The measuring system in this refinement may include learning system 42, which is trained in such a way as to output a classification as a function of the input variable, for example, which clinical picture is potentially present based on this input variable.

Figure 5:
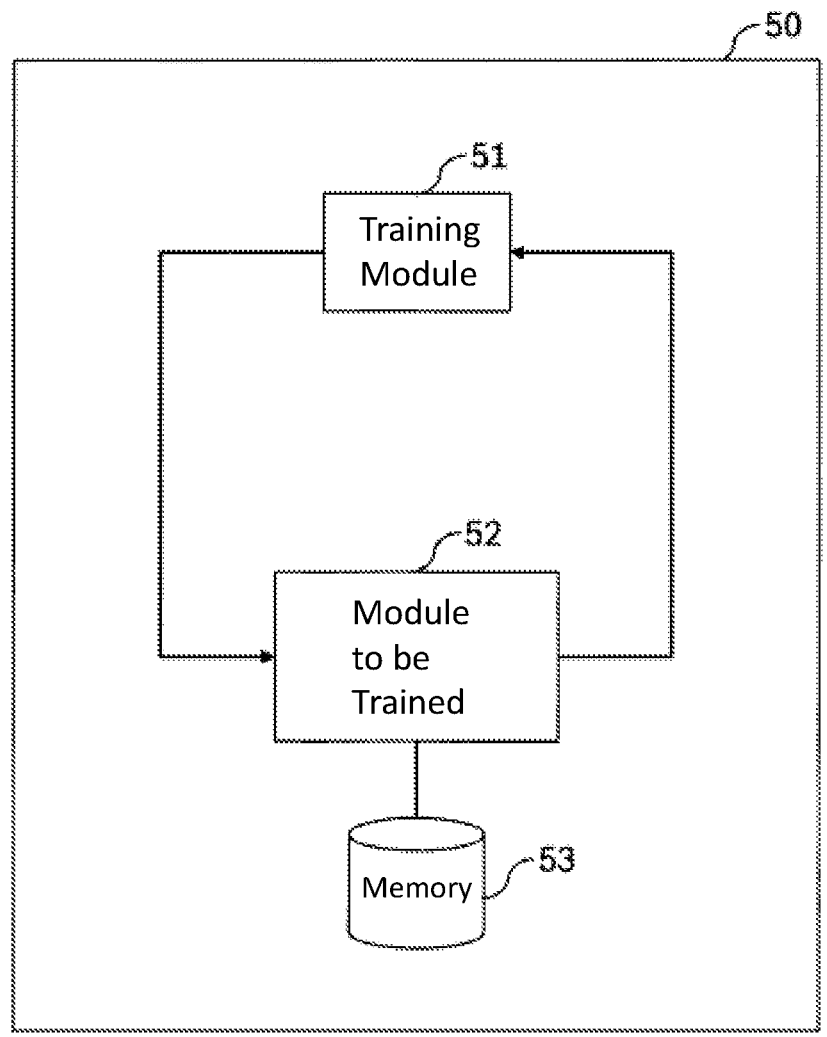
FIG. 5 schematically shows a representation of a device for training a machine learning system.

FIG. 5 schematically shows a representation of a device 50 for training graph 10, in particular, the machine learning system. Device 50 includes a training module 51 and a module 52 to be trained. This module 52 to be trained contains graph 10. Device 50 for training graph 10, trains graph 10 as a function of output variables of graph 10 and preferably with predefinable training data. For this purpose, the training data include a plurality of detected images, each of which are labeled. During the training, parameters of graph 10 stored in a memory 53 are adapted.

What is claimed is:

1. A device configured to operate a machine learning system, the machine learning system including a plurality of layers, which are connected with the aid of connections, the device comprising:
a machine-readable memory element, on which commands are stored which, when executed by a computer, ensure that the computer carries out a method that includes the following steps:
assigning to the machine learning system a predefinable rollout, which characterizes a sequence, according to which the layers each ascertain an intermediate variable,
when assigning the predefinable rollout, assigning to each connection or each layer a control variable, which characterizes whether the intermediate variable of the respective subsequent connected layers is ascertained according to the sequence or regardless of the sequence, and
calculating an output variable of the machine learning system as a function of an input variable of the machine learning system, the calculating being controlled as a function of the predefinable rollout,
wherein the control variables of the rollout are selected at random or as a function of an additional predefinable rollout.

2. The device as recited in claim 1,
wherein when controlling the calculation, each of the layers that ascertains according to the sequence ascertains step-wise and in succession the intermediate variable according to the sequence of the rollout, in each case at a predefinable point in time of a sequence of points in time, and those layers that ascertain their intermediate variables regardless of the sequence each ascertain their intermediate variables, in each case at each step at the respective predefinable points in time, and
wherein the machine learning system is assigned a plurality of different rollouts, in each case the calculating of the machine learning system being controlled as a function of the assigned rollouts, the controlled calculating of the machine learning system for each of the assigned rollouts being compared with one another based on at least one predefinable comparison criterion, the predefinable rollout being selected as a function of the comparison.

3. The device as recited in claim 1, wherein the sequence is executed step by step, in each step at least one of the layers ascertaining its output variable according to the sequence.

4. The device as recited in claim 1, wherein the machine learning system includes at least one skip connection, which connects a first layer to a second layer and the first layer and the second layer are also directly connected with the aid of at least two connections.

5. The device as recited in claim 4, wherein when assigning the rollout, those connections that connect a first layer with a second layer and the first layer and the second layer are also directly connected with the aid of at least two connections, are assigned the control variable, so that the intermediate variable of the second layer is ascertained regardless of the sequence.

6. The device as recited in claim 1, wherein the machine learning system includes at least one recurrent connection.

7. The device as recited in claim 1, wherein those layers that ascertain their intermediate variables regardless of the sequence, ascertain their intermediate variables as a function of a chronologically preceding intermediate variable of a chronologically preceding calculation step of the previous layer, and those layers that ascertain their intermediate variable according to the sequence, ascertain their intermediate variable as a function of a chronologically instantaneous intermediate variable of an instantaneous calculation step of the preceding layer.

8. The device as recited in claim 1, wherein the machine learning system does not include a closed path.

9. The device as recited in claim 1, wherein the intermediate variables of those layers, that ascertain their intermediate variable regardless of the sequence, are each ascertained in parallel.

10. The device as recited in claim 9, wherein the ascertainment in parallel of the intermediate values is carried out on processor cores connected in parallel.

11. The device as recited in claim 1, wherein the intermediate variables of those layers, that ascertain their intermediate variable regardless of the sequence, are ascertained asynchronously.

12. The device as recited in claim 1, wherein after the machine learning system is provided an input variable for the first time, it is checked after each step during a step-wise ascertainment according to the sequence of the output variable of the machine learning system, whether those layers that ascertain their intermediate variable regardless of the sequence are each provided an already ascertained intermediate variable of a previous layer.

13. The device as recited in claim 1, wherein a plurality of the control variables of the predefinable rollout characterize that respective intermediate variables are ascertained regardless of the sequence.

14. The device as recited in claim 1, wherein during the calculation of the machine learning system, the machine learning system is provided a sequence of input variables of an input layer of the machine learning system, in direct succession, in each case, at a time step of a sequence of time steps, each layer ascertaining at each time step as a function of an input variable, the respective intermediate variable, which in each case is assigned to one of the input variables.

15. The device as recited in claim 1, wherein in the case of one of the rollouts, all connections and layers are each assigned the same control variable, so that each of the output variables is ascertained regardless of the sequence.

16. The device as recited in claim 1, wherein in the case of one of the rollouts, all connections or layers are each assigned the same control variable, so that each of the output variables is ascertained regardless of the sequence.

17. The device as recited in claim 1, wherein the rollouts are compared with one another based on the predefinable comparison criterion, the predefinable criterion as a function of the control of the machine learning system being ascertained as a function of the respectively assigned rollout, the predefinable criterion including:
a first variable, which characterizes a number of time steps required in order, starting with a first time step at which the input layer is provided the input variable, to ascertain the output variable up to a second time step, the output layer not being connected to any additional layer.

18. The device as recited in claim 17, wherein the predefinable criterion includes a variable that characterizes how many output variables the machine learning system ascertains within a predefinable number of time steps.

19. The device as recited in claim 17, wherein the predefinable criterion includes a variable that characterizes how reliable an accuracy of the output variable of the machine learning system is with the aid of the respective rollout.

20. The device as recited in claim 17, wherein the predefinable criterion includes a variable that characterizes a period of time after which a start-up phase is completed, or the classification accuracy has reached a maximum value.

21. The device as recited in claim 17, wherein the predefinable criterion includes a variable that characterizes how many connections in direct succession include the same control variable.

22. The device as recited in claim 1, wherein the rollouts are also compared with a rollout based on the predefinable comparison criterion, in which all control variables provide the processing of the results according to the sequence.

23. The device as recited in claim 1, wherein the layers of the machine learning system are in each case a layer of a deep neuronal network.

24. The device as recited in claim 23, wherein the machine learning system classifies an image sequence.

25. The device as recited in claim 24, wherein the classification that takes place image element-wise is segmented.

26. The device as recited in claim 1, wherein the input variable of the input layer is a detected sensor variable and a control variable is ascertained as a function of the calculation of the machine learning system.

27. The device as recited in claim 1, wherein the device is used for training the machine learning system.

28. The device as recited in claim 1, wherein the device is used for a real time processing of a video with the aid of the machine learning system.

29. The device as recited in claim 1, wherein the device is for controlling a calculation of the machine learning system.

30. A device configured to operate a machine learning system, the machine learning system including a plurality of layers, which are connected with the aid of connections, the device comprising:
a machine-readable memory element, on which commands are stored which, when executed by a computer, ensure that the computer carries out a method that includes the following steps:
assigning to the machine learning system a predefinable rollout, which characterizes a sequence, according to which the layers each ascertain an intermediate variable,
when assigning the predefinable rollout, assigning to each connection or each layer a control variable, which characterizes whether the intermediate variable of the respective subsequent connected layers is ascertained according to the sequence or regardless of the sequence, and
calculating an output variable of the machine learning system as a function of an input variable of the machine learning system, the calculating being controlled as a function of the predefinable rollout,
wherein at least one of the control variables of the predefinable rollout is changed as a function of a disruption of the calculation of the machine learning system.

31. The device as recited in claim 30, wherein the disruption includes that the machine learning system has erroneously ascertained the output variable or one of the intermediate variables.

* * * * *